Oct. 1, 1957 C. W. JACOB 2,808,328
METHOD AND APPARATUS FOR XEROGRAPHIC REPRODUCTION
Filed July 15, 1950 3 Sheets-Sheet 1

INVENTOR.
CARLYLE W. JACOB
BY
ATTORNEY

Oct. 1, 1957     C. W. JACOB     2,808,328
METHOD AND APPARATUS FOR XEROGRAPHIC REPRODUCTION
Filed July 15, 1950     3 Sheets-Sheet 3

INVENTOR.
CARLYLE W. JACOB
BY
ATTORNEY ial representa-United States Patent Office
2,808,328
Patented Oct. 1, 1957

2,808,328

METHOD AND APPARATUS FOR XEROGRAPHIC REPRODUCTION

Carlyle W. Jacob, Rochester, N. Y.

Application July 15, 1950, Serial No. 173,987

17 Claims. (Cl. 96—1)

The present invention relates to a method and to apparatus for recording electrical signals, more especially for reproducing pictures, photographs, paintings, transparencies, films, and other pictorial representations. More particularly the invention relates to a method and apparatus for reproducing pictures and pictorial representations through use of a photo-sensitive matrix.

In making reproductions by the use of photo-sensitive materials, such as anthracene, sulphur, caesium or other materials, it is necessary to solve two problems, namely, first, to build a satisfactory photo-sensitive matrix that will be stable, sensitive, and have the proper relationship between light intensity and electrical conductivity, and second, to use a photo-sensitive surface in combination with pigment or other marking particles to produce faithful images of the original.

In one known process for pictorial reproduction through use of a photo-conductive surface, the marking particles are first evenly distributed over the photo-conductive surface, and then, having touched the surface, are selectively removed. One difficulty with this method, however, is that once the particles have come into contact with the surface, they tend to stick to that surface, and are no longer subject to delicate control. As the particles pile up on one another, moreover, they tend to clump together and become difficult to remove as individual particles. In the known process, furthermore, in order to transfer the image to paper, heating of the surface of the paper is necessary in order to fix the particles to the paper. The known process, moreover, does not lend itself readily to color reproduction. In color reproduction, the pigment particles have to be extremely fine. To maintain particles of the desired fineness in a finally divided state, a liquid vehicle is necessary, but in the known process of electro-photography, it is impractical to use a liquid vehicle, for the known process is of necessity of a dry system.

The primary objects of the present invention are to provide a process and apparatus for picture-reproduction in which a photo-sensitive material is used, and which will be simpler, better, and faster than any such process and apparatus heretofore used.

Another object of the invention is to provide a process and apparatus in which the pigment particles are selectively laid down on the photo-sensitive surface according to an electrical image on the surface, instead of being selectively removed from the surface.

Another object of the present invention is to provide a process and apparatus for pictorial reproduction which will permit the use of a liquid as a vehicle for the pigment particles, that is, which will permit the use of liquid pigment particles (droplets).

A further object of the invention is to provide a process for pictorial reproduction by use of a photo-sensitive surface which can be performed without the use of heat.

Still another object of the invention is to provide a process and apparatus for pictorial reproduction by use of a photo-sensitive surface which can be employed for color printing in a plurality of colors.

Another object of the invention is to provide a process and apparatus for pictorial reproduction under electrical control in which the various electrical quantities and elements can be controlled so as to improve the tonal values of the reproduction.

Other objects of the invention will be apparent hereinafter from the specification and from the recital of the appended claims.

In one method of practicing the invention, a droplet chamber is provided which is closed at one end by a transparent plate that is electrically conducting and that is coated with a photoconductive material. An image of the picture, which is to be reproduced, is projected through the transparent plate onto the photoconductive material thereby rendering the portions of the photo-conductive material which are illuminated, that is, which correspond to the clear portions of the picture, which is to be reproduced, conductive. The other areas of the photoconductive material remain non-conductive. A stream of electrically-charged ink droplets, say all charged negatively, is directed into the droplet chamber. These droplets are carried into the electrical field of the light-sensitive coating. The droplets that hit the non-conductive areas of the light-sensitive coating soon build up a strong negative electrical field that repels other droplets. However, at other areas where the light-sensitive coating has been rendered conductive, the charge on the droplets is carried away by the transparent plate thus permitting huge deposits of droplets at these areas. When a paper is rolled over the light-sensitive coating, a reproduction of the picture will appear on the paper. If the paper is very slightly conducting, or is soaked in non-conducting oil, or other liquid to provide a liquid transfer medium for the charge, the paper may be placed over the photoconductive material and the ink droplets deposited directly thereon so that a picture is reproduced directly on the paper by the charged ink-droplets. The image formed in this case will be a negative of the original.

To secure better definition, a screen or grid, which is preferably kept at ground potential is placed directly above the photoconductive surface and close thereto. The negatively-charged droplets have to pass through this screen or grid to reach the photoconductive surface. Being very close to the photoconductive surface, the screen or grid will electrically isolate the various areas of the photoconductive surface from one another and also electrically shield the space above the grid from the electrical charge on the photoconductive surface. Thus, the charged particles above the grid will be completely uninfluenced by the charge on the photoconductive surface until the droplets pass through the grid. Then they are influenced by the charge on that part of the photoconductive surface which is directly under the particles.

Figures 1, 2, 11:
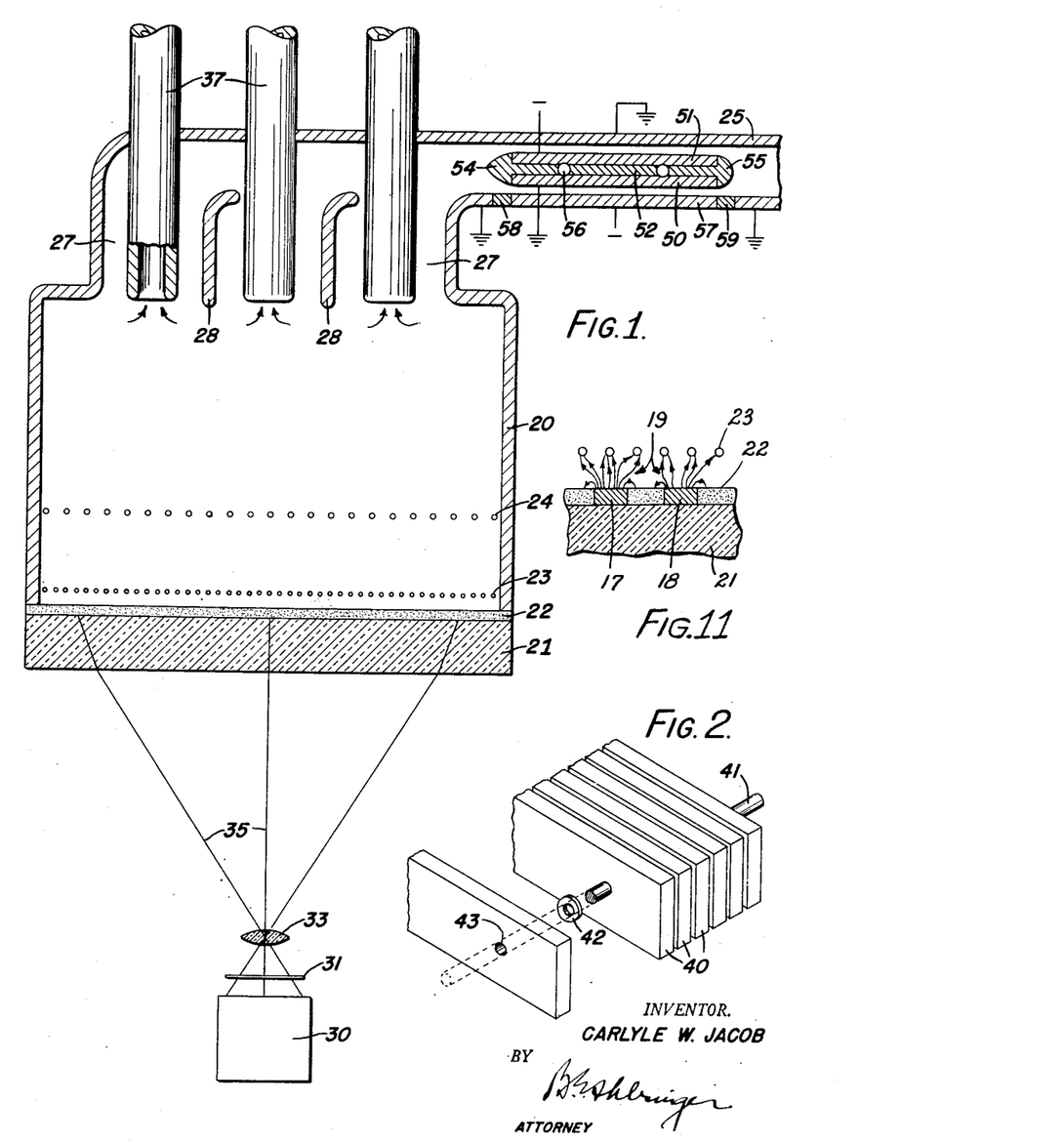
Fig. 1 is a longitudinal vertical section of a droplet chamber and cooperating droplet selector built according to one embodiment of this invention, and also illustrating somewhat diagrammatically the process of this invention.
Fig. 2 is a fragmentary perspective view, partly exploded, showing one form of grid that may be employed in the droplet chamber of the present invention.
Fig. 11 is an enlarged, fragmentary sectional view illustrating diagrammatically the isolating effect of the grid on the different potential areas of the matrix surface.

Referring now to the drawings by numerals of reference, and first to Fig. 1, 20 denotes a chamber, the bottom of which is closed by a transparent plastic plate 21 that is electrically conducting. This plate has its upper surface coated with a layer of photo-conducting material, such as sulphur, anthracene, or the like. Hereinafter, this surface will be referred to as a sulphur-coated surface, although it will be understood that any other suitable material may be used, or a mixture of suitable materials.

Mounted in the chamber 20 directly above the sulphur-coated surface 22 and spaced a slight distance therefrom is a fine screen or grid 23 which is electrically grounded and has, therefore, ground potential. Mounted in the chamber 20 some distance above this fine grid 23 is a coarser grid 24 which is also grounded. Both of these grids may be made of tightly-stretched wire screening or any other suitable material. It is understood that potentials can be applied to the grids 23 and 24 independently of the droplet chamber which may remain grounded or have a different potential.

Mounted below the droplet chamber 20 is a projector 30 in front of which is placed the picture which is to be reproduced, as, for instance, a transparency 31. The light from the projector 30 is transmitted through the transparency and through a lens 33 onto the electrically conducting plate 21 at the bottom of the droplet chamber. The light-rays 35 pass through the plate 21 onto the photo-conducting material 22.

Before making a picture, an even distribution of negative electro-static charge is put on the outer surface of the sulphur by evenly illuminating the sulphur with light. This can be accomplished by turning on the projector with the transparency 31 removed. At the same time the transparent conducting plate 21 is put at a negative potential. Then the light is removed and the conducting plate is put at a potential which is preferably slightly positive with respect to ground.

In making a picture electrically charged pigment particles, preferably liquid ink droplets, are introduced into the upper end of the chamber 20 through a duct 25 which communicates with the several ports or openings 27 formed in the upper end of the chmaber 20 by the partition members 28. The charged particles, which may be negatively charged, for instance, are led slowly into the droplet chamber; and they fall slowly out of the air stream in which they are carried and down through the two grids 24 and 23 which are preferably at ground potential, as in the droplet chamber 20. The air can pass out of the droplet chamber through the tubes 37 which are mounted in the upper portion thereof. When the image of the original transparency 31 is projected on the sulphur, the negative charge will leak off to the plastic plate at those areas of the plate where the light is strong, the degree of leaking at each unit area being determined by the strength of the light striking that area. In the areas of the photoconductive surface 22, which correspond to the dark portions of the transparency 31, the negative electro-static charge will remain. The negatively charged droplets dropping through the grid 23 over the surface of the sulphur will be repelled back to the screen 23 at these areas by the negative electrostatic charge on the sulphur. In those areas where the charge has leaked off the sulphur there will no longer be a repelling electric field between the plastic plate and the grounded grid element 23. Consequently the charged ink droplets will be deposited on the sulphur, and the charge on these particles, particularly if the particles are liquid particles will leak away to the plastic plate so that a heavy deposition of charged droplets can take place in a small area without an excessive retarding potential building up from the charge on the deposited droplets. Thus an inked image with full tonal graduations of the original transparency 31 will be formed on the sulphur. If now, a piece of paper, fabric, or other material is pressed or rolled over the surface of the sulphur the inked image will be transferred to the paper, fabric, or other material.

The grid 23 is electrically conducting and functions as a potential surface. Being very close to the photo-conductive surface 22, it will electrically isolate the various areas of the photo surface from one another, and also electrically shield the space above the grid from the electrical charge on the photo surface. Thus, the charged particles above the grid are completely uninfluenced by the charge on the photo surface below until they pass through the grid. Then they are influenced by the charge on that part of the photo surface which is directly under the particles. The grid should have many openings in it so as to permit a copious flow of droplets through these openings to the photo surface.

The isolating effect of the grid 23 on the various potential areas of the photo surface 22 is illustrated in Fig. 11 wherein said surface is shown as having an area of high potential indicated at 17 and an area of lower or medium potential indicated at 18. By placing the grid 23 close to the photo surface 22 most of the lines of force 19 which emanate from the potential area 17 will tend to flow generally vertically to the grid 23 rather than to adjacent potential areas such as 18 on the photo surface. In like manner the lines of force emanating from areas 18 also tend to flow to the grid. In other words, the grid 23 has the effect of generally confining the lines of force emanating from a given potential area to the space immediately above the area so that lines of force emanating outwardly from one potential area, such as 17 will influence only those charged particles which are in close proximity to said area and will have no substantial effect upon particles above an adjacent weaker potential area such as 18 for example.

The droplet chamber 20 should preferably be rather high so that by the time the droplets have reached the grids they will be free of any lateral swirling motion imparted by the ducts. At the grids 24 and 23, the droplets should be falling smoothly straight down. There should preferably be many entrance ducts 25 and exit ducts 37 per inch to distribute the particles evenly over the cross section of the droplet chamber; and Fig. 1 is, therefore, diagrammatic in this regard. The shield grid 24 may be added to shield the lower grid 23 from the space charge of the droplets above the shield grid.

The grid 23 may be simply a screen of say 200 mesh, or it may be made of parallel wires welded at intervals to support members above. The parallel wires should preferably be arranged in pairs with pairs spaced from one another. The two wires of a pair are preferably closely positioned and may even touch one another so as to provide a capillary trap to soak up excess ink. The particles, which are deposited on the grid 23 by being repelled from the sulphur coating 22, may be washed off at any time when the apparatus is cleaned. After a reproduction is made, the grid structure can be moved to one side and cleaned by a blast of solvent spray and then clean air.

Instead of using wires, rows of parallel plates or strips of metal, such as shown at 40 in Fig. 2, may be used. These plates should either be porous or grooved to soak up the ink more readily. The plates 40 can be secured together by rods or bolts 41 and spaced from one another by spacer washers 42. The rods or bolts pass through holes 43 in the plates.

If solid particles are employed rather than liquid particles, the grid should be preferably coated by some oil film so that the particles will adhere to it.

It is desirable that the screen or grid be moved slowly either continuously or intermittently with reference to the sulphur surface during the making of the reproduction so as to average out any defects in the grid openings and avoid any "shadow" effect.

Preferably a droplet selector is employed in the duct 25 to remove from the duct before they can reach the droplet chamber ink particles of sizes unsuitable for use in the process. This droplet selector comprises two preferably porous, metallic plates 50 and 51 that are spaced apart by a separator or core 52 made of porous ceramic or other porous insulating material. The ends 54 and 55 of this core extend beyond the ends of the plates 50 and 51; and the core may be provided with holes 56 through which the ink, which is deposited on the selector, may be drawn away by vacuum. The upper plate 51 has a negative charge and the lower plate 50 is grounded. The duct 25 itself is grounded but there is a plate 57 inserted in the duct opposite the plate 50 which is insulated from the duct itself by insulation pieces 58 and 59, and which has a negative charge.

The selector allows only droplets having a charge of the desired amount relative to the mass to pass on through the duct 25 to the droplet chamber. If the ratio of the charge to the mass is too large, the droplets are pulled up and precipitated on the upper surfaces of one or the other of the two passageways formed between the plates 50 and 51 and the duct 25. If the ratio is too small the droplets fall onto the lower surface of one or other of these passageways.

For the optimum functioning of the lower grid 23, the ratio of the charge to the mass of the droplets should not have too great a spread. This is rather obvious, for if the ratio is too small, the droplets will fall on the sulphur even if a strong repelling electric field exists, that is, even if no droplets are desired on the sulphur. If the ratio is too great, the droplets falling on the sulphur will, because of their heavy charge, set up an excessive, undesirable space charge.

The selector need not be in a horiztontal position as shown. It can be placed at a considerable angle to the horizontal so that the droplets, which pass the selector, need not change direction of flow too abruptly in order to enter the droplet chamber. Of course, a plurality of selectors may, if desired, be used in parallel.

Instead of using a sheet of conducting plastic 21 coated with sulphur or a similar compound, an ordinary non-conducting piece of plastic or glass may be employed with its upper surface coated with a thin half-silvered layer preferably in the form of a fine mesh that will be electrically conducting and yet permit the light to pass through. Over this conducting layer may be laid the sulphur coating. A fine, tightly-stretched metallic screen may also be substituted for the conducting plastic. It allows the light to pass through, and it is conducting.

The manner in which the droplets are deposited can be made to influence the relative intensities of the various tones so that faithful reproductions of the various tones are possible.

For example, if for a short time the projector behind the original transparency 31 is operated at a very low intensity then deposition of ink will take place only where the light would normally be very strong. At other areas there is zero deposition. If the projection lamp is then turned on to normal intensity and the deposition continued, in the resulting picture the dark areas will be darker than normal, the other areas will be unchanged. In a similar way, by reversing this procedure, the light areas can be intensified and, thus, the manner in which the projection lamp is made to change in intensity has an important influence on the reproduction.

There are other means of controlling the relative strength of the various tones in the reproduction as follows:

1. By varying during deposition the potential of the plastic plate or of the grids above such plate, so as to vary the electric fields that control deposition. The more negative the potential of the plastic plate is, the more the dark areas in the reproduction will be intensified relative to the light areas.

2. By varying during deposition the charge and/or size of the droplets. The larger the charge-mass ratio of the droplet is, the more the dark areas will be intensified.

3. By varying during deposition the rate at which droplets are introduced into the droplet chamber. The more rapidly the droplets are introduced, the greater the charge built up on the sulphur surface. This cause intensification of the darker areas.

4. By controlling the size and charge distribution of the particles introduced into the droplet chamber, if necessary, by mixing droplets from several atomizing guns, and 5. By varying during deposition the intensity of the projection lamp as discussed above.

If very heavy deposits are not required, the following procedure can be used. An even distribution of negative electrostatic charge is first put on the outer surface of the sulphur by turning light onto it with the plate negative. Next, with the plate 21 at approximately ground potential, an exposure is made of the original 31, that is, the image of the original 31, is projected on the sulphur for say about .01 second. At those areas of the sulphur where the light from the original was strong, the negative charge will leak away to the plate 21 leaving an electrostatic image of the original on the sulphur. If now negative droplets are led into the droplet chamber they will form an inked image of the original on the sulphur. The droplets used should not be too heavily charged so that a moderately intense deposit can be laid down before deposition ceases because of the repelling field created by the deposited charged droplets.

As already indicated, it is not necessary to first deposit the ink on the sulphur and then transfer it to a piece of paper. The paper can be laid on the sulphur before deposition and the ink can be deposited directly on the paper. In fact, a completely non-conducting material, like cellulose acetate can be substituted for the paper in the procedure described in the preceding paragraph. The acetate sheet has the added advantage of protecting the sulphur from the possible harmful effects of the ink. If desirable, however, a thin sheet of protective material like plastic can be permanently bonded to the outer surface of the sulphur.

To increase deposition beyond the amount limited by the repelling charge on the deposited droplets, the following procedure can be adopted: With a sheet of acetate on the sulphur, after a charged inked image has been formed on the acetate in the manner described above, the supply of droplets is turned off in the droplet chamber. With the plate 21 at ground potential and a general illumination on the sulphur, ionized air is circulated in the droplet chamber and around the grid until all charge on the acetate is neutralized. Then a second deposition of charged droplets is made to take place in the identical manner in which the first deposition was made.

Another procedure for making a reproduction is to make an exposure of the original on the sulphur with the plate 21 charged positively. Then with the plate at negative potential a deposition of negative droplets is made. At those areas where the light was strong there will be heavy deposition. At other areas there will be weak or zero deposition.

The reproductions which have been described so far are negatives of the original. Positive reproductions of the original can be made as follows: With the plate 21 charged negatively, an image of the original 31 is projected on the sulphur for about .01 second or until the exposure is made. Then the plate 21 is returned to approximately ground potential. Next negatively-charged droplets are introduced into the droplet chamber. An inked image will form on the sulphur or paper or other sheet material placed on the sulphur; and this image will be a positive reproduction of the original.

Figure 3:
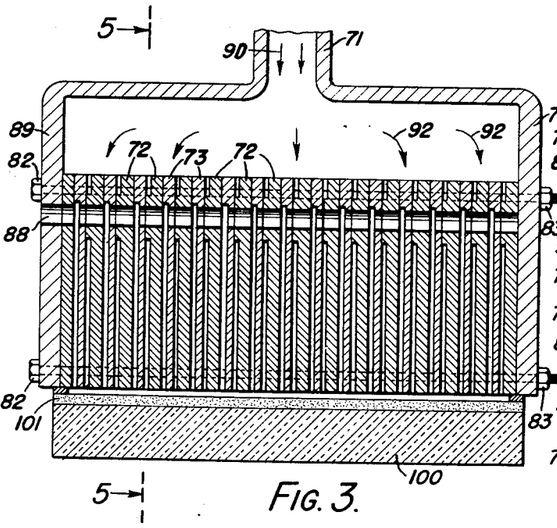
Fig. 3 is a longitudinal vertical section of a droplet chamber built according to a modification of this invention.
Figure 4:
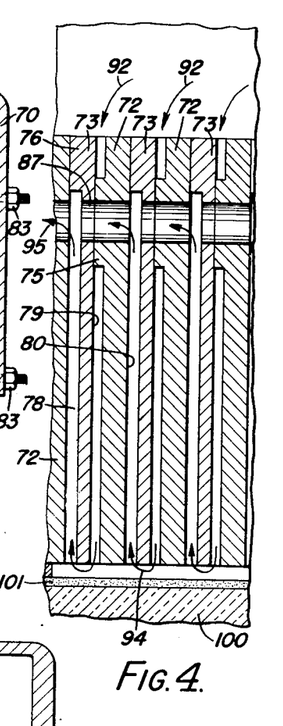
Fig. 4 is a fragmentary longitudinal vertical section through this modified form of chamber on a considerably enlarged scale.
Figure 5:
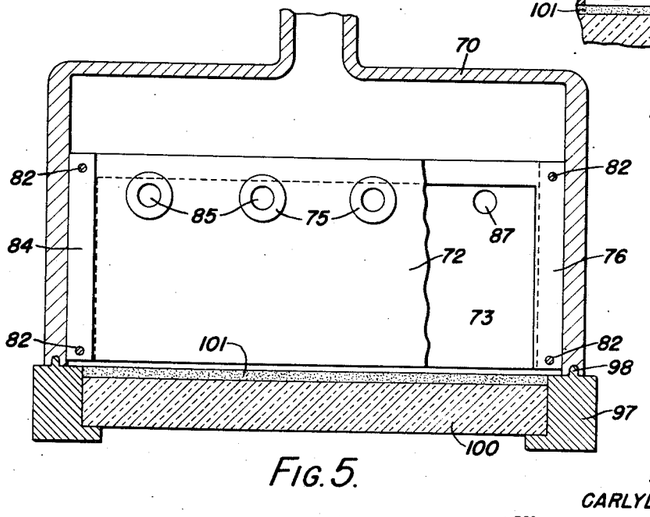
Fig. 5 is a transverse, vertical sectional view of this chamber taken on the line 5—5 of Fig. 3, part of one of the separators being broken away.

A modified form of droplet chamber is shown in Figs. 3 to 5 inclusive. Here the chamber is denoted 70. A suspension of electrically-charged particles in air or other gas is supplied to it through the duct 71, which may be integral with the chamber and which is preferably provided at the upper end of the chamber. A droplet selector may be provided in this duct, such as the selector shown in Fig. 1. Mounted within the chamber 70 are a plurality of plates 72 and a plurality of plates 73. The plates 72 alternate with the plates 73 and are of greater thickness than the plates 73. The right hand sides 79 and 80 of the plates 73 and 72, respectively, are plane surfaces. Each plate 72 is formed on its left hand face with a plurality of circular bosses 75, which act as spacers between the left hand side of that plate 72 and the right hand side of the next adjacent plate 73. Each plate 73 has a U-shaped flange 76 at one side of it extending around the top and two edges of the plate and adapted to contact with the adjacent right-hand plane side 80 of the adjacent plate 72 so as to provide a space 78 between the two adjacent plates 72 and 73, which is confined and bounded by the flange 76. The several plates are secured together at their four corners by rods or bolts 82. These rods or bolts pass through the walls of the chamber 70 and are secured thereto by nuts 83.

The bosses 75 of the plates 72 are drilled to provide holes 85 which extend therethrough. The holes 85 of the several bosses 75 of the several plates 72 are in alignment with each other. These several holes also align with holes 87 which extend through the thin portions of the plates 73. As a result there are ducts extending through the plates 72 and 73 from one side of the chamber to the other, said ducts being composed of aligned holes 85 and 87.

In the illustrated embodiment of the invention, there are four bosses 75 on each plate 72, therefore four holes 85 in each plate 72, and with each hole 85 there is an aligned hole 87 in each plate 73. Therefore, there are four ducts extending through the plates 72 and 73 from one side of the chamber 70 to the other. Holes 88 are provided in the left hand wall of the chamber 70 in alignment with the several ducts in the plates. These holes 88 act as discharge ports for the air. They preferably communicate with flues such as denoted at 91 in Fig. 6.

The chamber 70 may comprise a cover portion which slides on a base 97, being guided by the ridges 98 formed on the upper surface of the base. Base 97 carries the conducting transparent plastic plate 100 whose upper surface is coated, as denoted at 101, by sulphur or a similar material.

The operation of the apparatus of Figs. 3 to 5 is substantially the same as of that previously described. The coating 101 is first charged electrostatically. Then the image of the picture, which is to be reproduced, is projected through the transparent plate 100 onto the coating 101, and charged particles are directed into the chamber 70 from the duct 71, as denoted by the arrows 90. These particles pass, as denoted by the arrows 92, around the bosses 75 of the plates 72 into the spaces provided between the plates 72 and 73 by these bosses. The particles repelled by the coating 101 pass up between the plates 72 and 73, as denoted by the arrows 94, and are carried away through the ducts formed by holes 85 and 87, as denoted by the arrows 95. By sliding the cover portion of the chamber on the guides 98, the partition plates 72 and 73 can be shifted relative to the surface 101 to offset the "shadow" of the plates.

Figures 6, 7, 8, 9, 10:
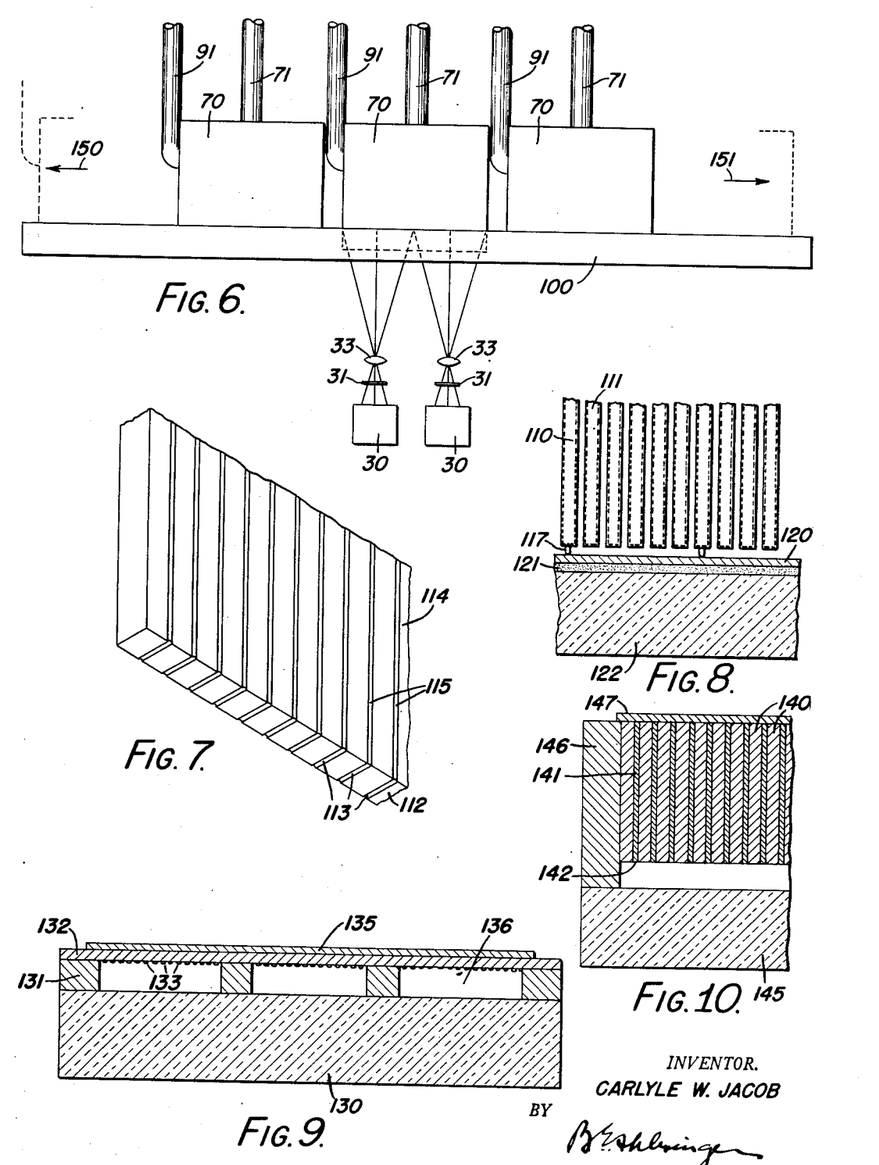
Fig. 6 is a more or less diagrammatic view showing how a plurality of droplet chambers may be employed according to one embodiment of the invention for free-color reproduction.
Fig. 7 is a fragmentary perspective view of a modified form of grid such as may be used in the apparatus of the present invention.
Fig. 8 is a fragmentary longitudinal, vertical sectional view showing one way in which this modified form of separator may be used.
Fig. 9 is a fragmentary vertical section of a different form of photo-sensitive surface that may be employed in practicing this invention.
Fig. 10 is a fragmentary vertical section of a further form of photo-sensitive surface that may be employed for practicing the invention.

In Figs. 7 and 8 an embodiment of the invention is shown in which the plates 110 and 111 used are of equal thickness. These plates are grooved along their bottom surfaces 112, as denoted at 113 and are also grooved along their sides 114 as denoted at 115. The grooves 113 are of small depth and width, as are the grooves 115, so that they may act as capillary ducts. The mist particles which are repelled at the surface 101 are caught in the grooves 113 and drawn up by capillary attraction through the grooves 115 to ducts which may be similar to the ducts formed by the holes 85 and 87 in the plates of Figs. 3 to 5. Here, the apparatus of the invention is illustrated as employed in printing directly on a sheet which may be acetate paper 120. Certain of the plates 110 are provided with feet 117 to hold down the paper 120 on which the reproduction is to be made, which is placed directly on the sulphur coating 121 of the transparent plate 122. The image is reproduced, therefore, directly upon the paper. Spacers (not shown) are provided between the several plates 110 and 111 to space them from one another.

Since the resolution of the system of Figs. 3 to 5 is a function of the closeness of the spacing of the passageways between the plates 72 and 73 (Figs. 3, 4 and 5), it is desirable that the inlet and outlet passages be narrow and close to one another. A duct width of .004 inch for the passageways with an intervening wall 73 of .002 inch is suggested. The alternate intervening walls 72, preferably extending down toward the sulphur a slightly greater distance, may be relatively thick say .010 or .012 inch to provide strength and also to permit, if desired, the provision in them of vertical capillary grooves, like those shown in Fig. 7, for conducting the ink deposited on them away from the bottom ends of the walls. Since the ink droplets do not flow directly under the thicker walls 72, the thickness of these walls does not influence the resolution of the system. However, the thick walls 72 should not be too thick so as to reduce appreciably the number of passageways per inch. To have a high rate of flow of droplets to the sulphur each second, it is necessary that there be many passageways per inch.

Preferably, the droplets used in this system should be relatively small so as to remain suspended in air. When a screen 23 or grid 40 (Figs. 1 and 2) is used, preferably larger size droplets are employed so that they may fall easily down and through the screens 24 and 23 or grid 40. In making reproductions by the apparatus of Figs. 3 to 5, the same procedures can be used for controlling the electric charge patterns on the sulphur as was used in the apparatus of Figs. 1 or 2. The only difference is that in using smaller particles, which tend to float in the air, one cannot depend on gravitational forces to drive the particles to the sulphur. Electrical forces must be provided for. This can be accomplished very readily by making the droplet chamber and the passageways slightly negative or by keeping the passageways at their normal ground potential and making the conducting plate 100 more positive than normal.

Preferably the air and droplet mixture should be made to circulate down the passageways intermittently in puffs, say 0.01 second in motion and 0.1 second at rest so that the droplets will have substantially no lateral motion during positioning. With the mist circulated in this manner good definition reproductions may be obtained also with passageways such as shown in Fig. 8. Here the passage-width is preferably small say .005 inch, while the walls 110 and 111, which are all of the same thickness, are all relatively thick say .010 to .020 inch. The thickness in this case does not influence resolution because the droplets are essentially at rest when deposition takes place. For a good resolution, the passageway structure should be relatively close to the acetate sheet 120, say .005 inch.

The photo-sensitive surface employed in the apparatus of this invention may be provided in various ways. As previously described, a photoconductive surface may be formed by coating a transparent conducting plate with sulphur, anthracene, or similar material. Fig. 9 shows a modification in which the transparent conducting plastic plate 130 is spaced by spacers 131 from a thin sheet of glass 132 on the back or underside of which are deposited tiny globules of photoemitting material like caesium, as denoted at 133. The supports or spacers 131 hold the thin piece of glass 132 to the heavy block of conducting plastic 130. In using this photosensitive surface, the sheet of paper 135, on which the reproduction is to be made, is preferably placed directly on the upper surface of glass sheet 132 during the reproduction process. When light from the projector strikes the caesium globules, electrons are emitted from the globules and are drawn to the conducting plate 130 when the latter is positively charged. Thus an electrostatic image can be put on the underside of the thin glass plate 132 which controls the deposit of material on the paper 135.

The globules 133 can be discharged by circulating an ionic gas in the spaces 136 between the thin glass plate 132 and its globules 133, and the conducting plate 130, or by maintaining the gas motionless and ionizing it with radioactive rays from an outside source. The cycles of forming the electrostatic image, depositing the ink droplets, then discharging the globules should be repeated a number of times. Between each cycle the photoblock (namely the thin glass and conducting glass structure) should be displaced a short distance so that the shadow effect on the paper 135 of the spacers 131 will be averaged out.

A block of ordinary glass with a half-silvered conducting coating on its upper surface may be substituted in the arrangement of Fig. 9 for the transparent conducting plastic plate 130. Preferably this conducting coating should be photo-emissive and therefore should be composed in part of caesium or other photo-emissive material. The coated glass block should also be so positioned that its photo-emissive coating is quite close to the globules 133 of the plate 132 above it. By applying a negative potential to the half-silvered conducting coating, instead of a positive potential, electrons will flow to the globules 133 when the system is illuminated. Thus an electrostatic negative image may be obtained on the globules, and a masked image may be formed as described hereinafter. By illuminating the whole system evenly, moreover, a convenient method is provided for discharging the globules.

Fig. 10 shows a still further embodiment. Here a photo-sensitive matrix is provided consisting of glass or a plastic material 140 in which is imbedded fine insulated wires 141. These are placed parallel to one another and can be cemented together. The lower ends 142 of the wires, which are the ends receiving the light, are coated with a photoelectric emitter like caesium. The transparent conducting plastic plate is denoted at 145; and 146 is the block in which the photoelectric matrix is mounted. 147 is the sheet of paper on which the image is to be reproduced.

In a modification of the arrangement of Fig. 10, the wires may be of the coaxial type with the outside sheath of one wire touching the outside sheaths of the adjacent wires and with these sheaths maintained at a fixed potential, say ground. This construction has the advantage of eliminating the capacity coupling between wires and also aids in confining the electric fields at the upper matrix surface next to the recording paper sheet 147. With the electric fields at the surface partially isolated in this manner, the duct structure shown in Figs. 3 to 5 inclusive may be placed somewhat further away from the photo-sensitive matrix than is possible when a simple, photosensitive surface, such as that shown in those figures is used.

This same method of isolating the electric fields at the surface where particle-deposition takes place can be applied directly in Figs. 3 to 5 by merely embedding a fine wire screen in the surface of the sulphur or by projecting the original, which is to be reproduced through a half-tone screen. This latter procedure will leave a constant potential matrix at the surface of the recording paper sheet.

In a still further embodiment of the invention, the conducting plate 145 may be replaced by a glass plate 145 whose upper surface is coated with a conducting coating composed in part of caesium as described above.

As already stated the method and apparatus of the present invention lend themselves readily to color reproduction. Full color pictures can readily be made by making three exposures of the original on the sulphur. With say the first exposure a blue filter is used between the projector 30 and the plate containing the photosensitive coating; with the second exposure a green filter is employed; and with the third exposure a red filter is provided. For each exposure the appropriately colored inks are led into the droplet chamber. A yellow ink is used with a blue filter, magenta ink with the green filter, and cyan ink with the red filter. These are the inks normally used in the subtractive color process.

Between the application of each new color the charge on the surface of the paper should be erased by flowing ionized air or other gas over the surface of the paper. The ions in the gas will discharge the electric charge on the paper. The charge on the sulphur can be erased easily by applying a general illumination to it at the same time grounding the plastic plate. Color correction referred to in photographic literature as masking, is possible with this system. For example, in correcting the green image for the absorption of the cyan pigment, the following procedure would be used assuming the original is a positive: First an even distribution of weak negative charge is put on the surface of the sulphur of the conducting plate. Then with the conducting plate at ground potential, and the red filter over the original 31, an exposure is made of the original. This produces an electrostatic mask on the sulphur. Next with the red filter replaced by the green filter, and the conducting plate at a strong negative potential, a second exposure is made of the original, and then the plate is returned to approximately ground potential. The resultant electrostatic image will be a masked image. Next the magenta droplets are led into the droplet chamber and an ink image produced in magenta.

A slightly different procedure for producing the electrostatic masked image is as follows: With the conducting plate at a mild positive potential an exposure is made with the red filter over the original. This puts a mask of positive charge on the sulphur. Next with the conducting plate at a strong negative potential a second exposure is made of the original with the red filter replaced by a green filter. Then, with the plate put at approximately ground potential, the system is ready for the introduction of magenta into the droplet chamber.

Color correction or masking is also possible with the apparatus such as shown in Figs. 9 and 10, when the transparent plate 130 or 145 is replaced by an ordinary glass plate whose upper surface is coated with a conducting coating containing a photoemissive material such as caesium. With this conducting coating at a negative potential, a short exposure is made of the original through the red filter. Then with the red filter replaced by a green filter and the conducting coating of the glass plate at a positive potential, a stronger exposure is made. Then the conducting coating is put at approximately ground potential; and positively charged droplets are led into the droplet chamber. The potentials used should preferably be such that a suitable relationship will exist between the photoelectric current and the illumination.

For three color work, a bank of three separate droplet chambers 70 may be also used such as shown in Fig. 6. Each chamber may be constructed as shown in Figs. 3 to 5 and each chamber is for depositing a differently colored ink. After a color is deposited by one chamber, the bank of chambers is shifted to bring another color chamber into position to deposit its ink. The arrows 150 and 151 denote the shifting movement and the dotted lines indicate the extreme positions of the bank of chambers at right and left at the ends of the shifting movement. Appropriate color filters, are, of course, used during deposit of the different colors on the paper or sulphur. A red filter is used for cyan ink, a green filter for magenta, and a blue filter for yellow ink. In this figure two projector systems are shown, for with the method of the present invention a plurality of reproductions can be made simultaneously. The number is limited only by the practical limitations of space.

While the invention has been described in connection with embodiments in whch the mist is allowed to fall by gravity onto the photoconductive surface of the paper thereon, it should be understood that gravity is not necessary to bring the droplets to the vicinity of the photosurface. For instance, with the shield grid 24 (Fig. 1) omitted and the entrance and exit duct members 28 and 37 at a negative potential relative to the grid 23, the negatively-charged droplets would be drawn by the electric field to the grid 23 and photosurface 22. In fact, this system would operate with the apparatus inverted. Furthermore, the pigment mist may be directed into the droplet chamber from one side between the grid and photosurface. As long as there is a potential surface above the surface on which the deposit of ink is made, there will be electric field lines which are more or less vertical and which will provide for a correct deposit. The plates shown in Fig. 8, for instance, might be widely spaced and the droplets introduced from the side of the chamber underneath the plates, but the advantage of using many plates and letting the particles go to the photosurface through passageways between the plates is that so many more particles can be introduced into the chamber in a given period. Where the particles are introduced from the side, greater time is required to admit sufficient particles to make a picture. Also areas near the entrance might rob the stream of mist of most of the particles.

In the various embodiments of the invention employing screens, grids, or plates it is to be noted that the various grids, or plates acting as grids, should preferably be set at an angle to the direction that they are shifted during deposition. Thus, the shadow effect of all obstructions in the grids, like washers, will be averaged out.

While the invention has been described in connection with apparatus in which the electrostatic image is put on the sulphur by projecting an image of the original through a conducting plate onto the under side of the sulphur, the electrostatic image might be put on the sulphur in known manner by projecting an image of the original onto the upper (exposed, outer) surface of the sulphur. Then the sulphur-coated plate holding the electrostatic image can be inserted in the droplet chamber and the ink particles deposited thereon under control of the electrostatic image. This requires, however, that the electrostatic image be formed first, and then the ink particles be deposited, whereas with the preferred embodiments of the invention described, the electrostatic image can be formed on the plate in the droplet chamber and at the same time the ink deposit can take place. A further advantage of exposing the sulphur from the rear through a piece of glass or transparent plastic is that it is possible thereby to deposit several color patterns one on top of the other. When the sulphur is exposed from the front, one color deposit must be removed before laying down the next one. Still another advantage of exposing the photosensitive surface from the rear is that the various electrical quantities can be altered while deposition is taking place.

As contrasted with known practice, the process of the present invention has advantage for high-grade tonal reproductions since the motion of fine particles is much more sensitive to control while the particles are "free" particles than after they come into contact with any surface. Moreover, the system of the present invention eliminates all need for heating the paper on which the image is reproduced. When ink droplets hit a piece of paper they soak in immediately. No heat is required to fix the particles to the paper.

It will be noted, further, that while the invention has been described particularly in connection with projection of a light image of the original onto the photosensitive matrix by means of a projector, the image, which may be any form of electric image, can be projected onto the matrix in other ways. For instance, the matrix of wires in the embodiment of the invention shown in Fig. 10. might constitute the end section of a cathode ray tube, like a television or radar tube. The wires would then receive their charge directly from the electron gun in the tube.

Furthermore, while the invention has been described chiefly in connection with the use of negatively-charged marking particles, positively-charged particles can be used equally as well. Of course, in reversing the polarity of the charge on the particles, the potentials of the various elements, such as the conducting plate, grid, etc., should be reversed.

The marking particles used in the invention include not only the customary black and colored inks, but also other media such as dyes and transparent gelatin or plastics. By using gelatin particles high quality matrixes can be made for use in the dye transfer printing process. The marking particles can be charged by the methods outlined in my copending application, Serial No. 2,624, filed January 26, 1948, now U. S. Patent 2,577,-894, or in my copending application, Serial No. 17,773, filed March 29, 1948, now U. S. Patent 2,573,143.

In connection with Fig. 1, I have disclosed a modification of the invention in which the potential for the conducting plate is cycled during the making of a reproduction. The same result could, of course, be accomplished by maintaining the conducting plate at a constant potential and cycling the grid structure and droplet chamber with potentials of opposite polarity. It is the electrical fields that are important.

In all the various procedures described above for making a reproduction, the relative strengths of the various tones can be controlled, when feasible, by the methods outlined on column 6, lines 11 to 31, inclusive.

Wherever the term "transparent plate" is used in the specification or claims it is intended to include a perforated opaque plate such as a screen. Similarly, the term "conducting plate" is intended to include a plate or screen made of a non-conducting material but having a surface coating of a conducting material. In like manner, the term "grid structure" is intended to include both a duct structure such as shown in Figs. 3 to 5 inclusive as well as a screen structure such as shown in Figs. 1 and 2.

The term "photoelectric matrix" includes not only the photoconductive or photoemissive layer but any covering for that layer such as a record sheet when used. It includes in Fig. 1, for instance, the transparent plate 21 and the coating 22, and in Fig. 8, the transparent plate 122, coating 121, and record sheet 123. As applied to Fig. 9 it includes plate 130, spacers 131, plate 132 and photo-emissive material attached to the back of plate 132, and the record sheet 135. As applied to Fig. 10, this term includes plate 145, wires 141, bonding material 140, and record sheet 147.

While the invention has been described, then, in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of making a pictorial record which comprises projecting a light image onto a photoelectric matrix through a transparent electrically conducting plate, which is at one side of said matrix, and operatively related thereto to produce an electrical charge-image on the matrix corresponding to said light image, and simultaneously directing previously electrically-charged marking particles which are suspended in a gaseous atmosphere at the opposite side of said matrix and into the electrical field of the matrix whereby to build up on the opposite side of the matrix a reproduction of the light image and to continually drain the charge away from the illuminated areas of the matrix.

2. The method of making a pictorial record which comprises projecting a light image onto a photoelectric matrix through a transparent plate, which is at one side of said matrix, to produce an electrical image on the matrix, different areas of which have different potentials, electrically isolating different areas of said matrix from one another by disposing an electrically-conductive, foraminous grid structure at the opposite side of said matrix and close enough to said matrix so that the electric lines of force emanating outwardly from the different potential areas of said matrix tend to flow to said grid structure, and directing electrically-charged marking particles through said grid structure into the electrical field of said matrix, while maintaining the electrical isolation of said different areas so as to cause different amounts of particles to be deposited on said areas in accordance with the varying potentials of said areas.

3. The method of making a visible pattern which comprises distributing an electrical charge of one sign evenly over a photoelectric matrix which has a transparent, electrically-conducting plate close enough to one side to continually drain away an electrical charge, then directing electrically-charged marking particles that are suspended in a gaseous medium and that are of the same sign at the opposite side of said matrix and into the electrical field of said matrix, while simultaneously projecting a light image through said plate onto said matrix so that the charge in said matrix is continually drained away from the illuminated areas of said matrix and marking particles are selectively deposited over said illuminated areas while they are deflected away from the other areas.

4. The method of making a visible pattern which comprises distributing an electrical charge of one sign evenly over a photoelectric matrix which has a transparent, electrically-conducting plate at one side, then directing electrically-charged marking particles of the same sign at the opposite side of said matrix and into the electrical field of said matrix, through an electrically-conductive, foraminous grid structure which is disposed close enough to said matrix so that the electric lines of force emanating outwardly from the different potential areas of said matrix tend to flow to said grid structure, while projecting a light image through said plate so that the charge in said matrix is drained away from the illuminated areas of said matrix and marking particles are selectively deposited over said illuminated areas while they are deflected away from the other areas.

5. The method of making a colored pictorial reproduction of a colored original which comprises, projecting a light image in one color onto a matrix through a transparent plate lying at one side of said matrix, to produce on said matrix an electrical image, different areas of which have different potentials in accordance with differences in tonal values of corresponding areas of said original, while directing into the electrical field of the matrix through an electrically-conductive, foraminous grid structure, which is spaced from but disposed in operative relation to the matrix, at the opposite side from said transparent plate, electrically-charged, colored marking particles whose color is complemental to said one color, whereby particles are deposited on said matrix in accordance with said image, then erasing at least part of the charge from the deposited particles and from said matrix, while leaving the particles on said matrix, then projecting on the matrix successively through said transparent plate a plurality of other colored images of the original, and directing during successive such exposures differently colored, electrically-charged marking particles through said grid structure into the electrical field of the matrix, the particles so directed during each such exposure being complemental to the other color used during that exposure, and at least part of the charge on the deposited marking particles and on the matrix being erased between successive exposures, while leaving the particles on the matrix.

6. In apparatus of the character described, a photoelectric matrix, a foraminous, electrically-conductive grid structure disposed in opposed relation to said matrix, and means for directing electrically-charged marking particles suspended in a fluid through said grid structure into the electrical field of said matrix, said grid structure comprising a plurality of elongated members extending away from said matrix so as to form a series of supply and exhaust ducts interspersed with one another, the supply ducts serving to conduct the suspension of particles to the electrical field of the matrix, and the exhaust ducts serving to conduct said fluid and any particles remaining in said fluid away from the electrical field of said matrix.

7. In apparatus of the character described, a photoelectric matrix comprising a transparent electrically-conducting plate, and a parallel plate which has electrical conductors embedded therein and extending perpendicular to the first plate, the ends of the conductors adjacent the first plate being coated with a photo-emissive material, means for projecting a light image through said first plate onto said ends of said conductors, and means for conducting electrically-charged marking particles suspended in a gas into the electrical field of said matrix at the side of said parallel plate most remote from said first plate.

8. In apparatus of the character described, a photoelectric matrix comprising a transparent electrically-conducing plate, and a parallel plate which is spaced from the first plate and which has coaxial sheathed electrical conductors embedded therein and extending perpendicular to said first plate, the outside sheath of one conductor touching the outside sheaths of the adjacent conductors, and the sheaths being maintained at a fixed potential, the ends of the conductors adjacent said first plate being coated with a photo-emissive material, and means for conducting electrically-charged marking particles suspended in a gas into the electrical field of said matrix at the side of said parallel plate most remote from said first plate.

9. The method of producing a visible pattern on a photoelectric matrix which comprises projecting a light image onto said matrix through a transparent electrically-conducting plate which lies at one side of said matrix, and is part of said matrix thereby to produce on said matrix an electrical charge-image corresponding to said light image, directing electrically-charged marking particles entrained in a gaseous atmosphere toward the opposite side of said matrix and into the electrical field of said matrix so as to deposit the marking particles on said matrix according to said charge-image, then projecting a second and different light image through said transparent plate onto said matrix without removing the first-deposited particles, thereby to form a second electrical charge-image on said matrix under the first-deposited particles, entrained in a gaseous atmosphere and directing other electrically-charged marking particles into the electrical field of said second charge-image so as to make a second deposition of particles on said matrix and on at least some of the first-deposited particles.

10. In apparatus of the character described, a photoelectric matrix, means for forming on said matrix an electrical image pattern different areas of which have different potentials, an electrically-conductive, foraminous grid structure positioned in opposed operative relation to said matrix, a second foraminous grid structure positioned above the first-named grid structure and further away from said matrix, and means for directing electrically-charged marking particles through both grid structures so as to reach those areas of the matrix where particle-attracting potential areas exit, the second-named grid structure comprising a plurality of elongated members extending away from the first named grid structure so as to form a series of supply and exhaust ducts interspersed with one another, the supply ducts conducting the particles toward the first-named grid structure, and the exhaust ducts carrying away undeposited particles.

11. In apparatus of the character described, a continuous, transparent, electrically conductive plate, a coextensive layer of photoconductive material on the front side of said plate, a foraminous grid structure, means for projecting a light image through said plate onto the rear side of said photoconductive material whereby to form an electric charge image corresponding to said light image on the front side of said material, and means for simultaneously directing charged marking particles suspended in a gas through said grid structure toward said front side of said material and into the electrical field thereof.

12. In apparatus of the character described, a photoelectric matrix comprising two parallel, spaced plates, the first of said plates having a photo emissive material applied to the side thereof which is adjacent the other plate, said other plate being transparent, means for projecting a light image through said transparent plate onto the photo emissive material on the first plate whereby to form on the opposite side of said first plate an electrical charge pattern, different areas of which have different potentials, foraminous means positioned adjacent said opposite side of said first plate for electrically isolating the different potential areas thereon from one another, and means for directing electrically charged marking particles through said foraminous means and into the electrical field of said matrix.

13. In apparatus of the character described, a photoelectric matrix, means for forming an electrical charge pattern on said matrix different areas of which have different potentials, means including a foraminous grid structure for conducting electrically charged marking particles suspended in a gas into the electrical field of said matrix for deposit on said matrix, said grid structure comprising a plurality of elongated spaced members positioned adjacent said matrix and disposed in planes which intersect the plane of said matrix, and means including well defined capillary ducts formed in the walls of said members for conducting away particles deposited on said members, the collective ends of said members immediately adjacent said matrix constituting an electrically conductive grid electrode for electrically isolating from one another the different potential areas on said matrix.

14. In apparatus of the character described, a pattern surface, means for forming an electrical charge pattern on said surface, different areas of which have different potentials, a foraminous structure disposed in opposed relation to said pattern surface and spaced therefrom, means for directing electrically charged marking particles suspended in a gas through said foraminous structure into the electrical field of said charge pattern, said foraminous structure comprising a series of plates extending away from said pattern surface and arranged in spaced relation so as to form a plurality of supply and exhaust ducts alternating with one another, the supply ducts serving to conduct the suspension of particles to the electrical field of the charge pattern on the pattern surface and the exhaust ducts serving to conduct the gas and any particles remaining in said gas away from the electrical field of said pattern surface, and means, including the collective ends of said ducts, constituting an electrically-conductive grid electrode for generally electrically isolating the different potential areas from one another, said grid electrode being located close enough to said surface that the electrical lines of force which emanate outwardly from the potential areas on said surface tend to flow toward said grid electrode rather than to other potential areas of said surface.

15. In apparatus of the character described, a chamber having a photoelectric matrix mounted therein comprising a transparent plate and photoelectric material applied to one face of said plate, said plate lying at one side of said matrix, means for projecting a light image through said plate from said one side of said matrix onto said photoelectric material so as to form an electrical charge pattern on said material, different areas of which have different potentials, an electrically-conductive, foraminous grid structure which is disposed at the opposite side of said matrix from said plate and which is positioned parallel to said matrix and is spaced from said material, and means for directing a stream of electrically-charged marking particles through said grid structure toward said opposite side of said matrix, said grid structure being close enough to said opposite side of said matrix so that the electrical field lines emanating from the charged areas on said matrix tend to flow to said grid structure rather than to neighboring areas of said matrix.

16. The method of making a visible pattern which comprises distributing an electrical charge of one sign evenly over a photoelectric matrix which has a transparent electrically conducting member close enough to one side to drain away an electric charge, and projecting a light image from said one side onto said matrix through said transparent member to produce an electrical charge image on the matrix at the opposite side thereof corresponding to said light image, and directing previously electrically charged marking particles that are of the same sign and which are suspended in a gaseous medium, at said opposite side of said matrix and into the electrical field of said charge image whereby to build up on the matrix a reproduction of said light image, and without moving the charge image on the matrix away from the source of the projected light image, continuing the projection of said light image on said matrix after the deposition of marking particles on said matrix has started and before it is finally completed to drain away charge from the illuminated areas of the matrix.

17. The method of producing a visible pattern on a photoelectric matrix which comprises charging said matrix by distributing an electrical charge of one sign over said matrix, projecting a light image onto said matrix through a transparent electrically conducting member which lies at one side of said matrix and is part of said matrix, thereby to produce on said matrix an electrical charge image corresponding to said light image, directing electrically charged marking particles entrained in a gaseous atmosphere toward the opposite side of said matrix and into the electrical field of said matrix so as to deposit the marking particles on said matrix according to said charge image, and after some of the marking particles have been deposited on the matrix continuing the projection of said light image on the matrix to drain away charge from the illuminated areas of the matrix, then recharging the matrix and projecting a second and different light image through said transparent member onto said matrix without removing the first deposited particles thereby to form a second electrical charge image on said matrix under the first deposited particles, and directing other electrically charged marking particles entrained in a gaseous atmosphere into the electrical field of said second charge image so as to make a second deposition of particles on said matrix and on at least some of the first deposited particles.

References Cited in the file of this patent

UNITED STATES PATENTS

| | | |
|---|---|---|
| 1,818,760 | Selenyi | Aug. 11, 1931 |
| 2,098,441 | Troland | Nov. 9, 1937 |
| 2,150,168 | Ives | Mar. 14, 1939 |
| 2,152,077 | Meston | Mar. 28, 1939 |
| 2,193,722 | Hardy | Mar. 12, 1940 |
| 2,221,776 | Carlson | Nov. 19, 1940 |
| 2,277,013 | Carlson | Mar. 17, 1942 |
| 2,281,638 | Sukumlyn | May 5, 1942 |
| 2,297,691 | Carlson | Oct. 6, 1942 |
| 2,357,809 | Carlson | Sept. 12, 1944 |
| 2,408,143 | Huebner | Sept. 24, 1946 |
| 2,484,782 | Copley | Oct. 11, 1949 |
| 2,509,276 | Ransburg | May 30, 1950 |
| 2,551,582 | Carlson | May 8, 1951 |
| 2,633,796 | Pethick | Apr. 7, 1953 |
| 2,691,343 | Huebner | Oct. 12, 1954 |
| 2,691,345 | Huebner | Oct. 12, 1954 |

FOREIGN PATENTS

| | | |
|---|---|---|
| 241,636 | Great Britain | Oct. 6, 1925 |
| 605,979 | Great Britain | Aug. 4, 1948 |